US009345192B2

(12) United States Patent
Vondráček et al.

(10) Patent No.: US 9,345,192 B2
(45) Date of Patent: May 24, 2016

(54) MOWING DEVICE

(71) Applicant: DVORÁK SVAHOVÉ SEKAČKY S.R.O., Havlíčkův Brod (CZ)

(72) Inventors: Pavel Vondráček, Havlíčkův Brod (CZ); Lubomír Dvořák, Havlíčkův Brod (CZ)

(73) Assignee: DVORAK SVAHOVE SEKACKY S.R.O., Havlickuv Brod (CZ)

( * ) Notice: Subject to any disclaimer, the term of this patent is extended or adjusted under 35 U.S.C. 154(b) by 0 days.

(21) Appl. No.: 14/401,729

(22) PCT Filed: Oct. 24, 2013

(86) PCT No.: PCT/CZ2013/000136
§ 371 (c)(1),
(2) Date: Nov. 17, 2014

(87) PCT Pub. No.: WO2014/067500
PCT Pub. Date: May 8, 2014

(65) Prior Publication Data
US 2015/0096280 A1 Apr. 9, 2015

(30) Foreign Application Priority Data
Oct. 31, 2012 (CZ) .................... 2012-741

(51) Int. Cl.
*A01D 34/66* (2006.01)
*A01D 34/76* (2006.01)

(52) U.S. Cl.
CPC .............. *A01D 34/664* (2013.01); *A01D 34/66* (2013.01); *A01D 34/76* (2013.01)

(58) Field of Classification Search
CPC . A01D 34/005; A01D 34/664; A01D 34/665; A01D 34/412; A01D 34/66
USPC ........... 56/157, 234, 235, 255, 256, 295, 13.6
See application file for complete search history.

(56) References Cited

U.S. PATENT DOCUMENTS

| 4,090,346 | A | * | 5/1978 | Doi | A01D 34/685 56/13.6 |
| 5,113,640 | A | * | 5/1992 | Colistro | A01D 34/66 56/13.6 |
| 8,051,631 | B2 | * | 11/2011 | Nishihara | A01D 43/063 56/17.5 |

FOREIGN PATENT DOCUMENTS

| GB | 973 945 A | 11/1964 |
| GB | 1 134 514 A | 11/1968 |
| GB | 1 147 236 A | 4/1969 |

*Primary Examiner* — John G Weiss
(74) *Attorney, Agent, or Firm* — Ladas & Parry LLP

(57) ABSTRACT

A mowing device for the treatment of vegetations is adapted for the attachment to a carrier and for the connection to a drive unit. The mowing device includes a frame, on which mowing spindles are mounted which are provided on one side with mowing blades and on the opposite side with distributing elements for the connection to transmission members. On the frame, a transmission mechanism for driving the mowing spindles is further positioned. The mowing spindles are arranged in two mutually parallel rows, defined by longitudinal lines, located in a mutual distance separation. The mowing spindles of each row are interconnected by the transmission members. The centers of the mowing spindles of the first row on a line are located in a mutual spacing. The centers of the mowing spindles of the second row on the line are located in the mutual spacing. The centers of the mowing spindles of the second row are offset in the direction of the lines by a one-half P/2 of the spacing P with respect to the centers of the mowing spindles of the first row on the line. A connecting line of the center of each mowing spindle of the first row on the line with the center of the immediately adjacent mowing spindle of the second row on the line forms with parallel longitudinal lines an acute angle, for which the following applies: L tg a=P/2 The size of the angle a is in the range from 15° to, 60°. The transmission mechanism for driving the mowing spindles with two transmission devices mounted side by side on the frame and mutually connected. The first transmission device is arranged for the rotation in one rotational direction and is connected via transmission members with the mowing spindles of the first row on the line. The second transmission device is arranged as a reverse device for an optional rotation of the output shaft of the gearbox in both rotational directions, and it is associated via transmission members with the mowing spindles of the second row on the line.

14 Claims, 12 Drawing Sheets

MOWING DEVICE

RELATED APPLICATION

This application is a national phase entry under 35 U.S.C. 371 of International Patent Application No. PCT/CZ2013/000136 filed on 24 Oct. 2013, which was published on 8 May 2014 with Internation Publication Number WO 2014/067500 A2, which claims priority from CZ Patent Application No. PV 2012-741 filed on 31 Oct. 2012, the disclosures of which are incorporated in their entirety by reference herein.

TECHNICAL FIELD OF THE INVENTION

The invention relates to a mowing device for the treatment of vegetations.

BACKGROUND ART OF THE INVENTION

Several kinds of mowing devices and equipments are known in practice for mowing or mulching grasslands, small natural seeded shrubs, or similar vegetations and areas.

Mowing devices of a multi-rotor mowing machine, cutting devices for mowing machines, rotary mowing devices, rotary disc mowing devices, etc. are known.

Disadvantages of the existing above mentioned mowing devices consist mainly in relatively large energy demands of a drive due to large friction losses at the cutting drums or cutting rotors.

Another disadvantage consists in the impossibility of their universal use for mowing or mulching.

None of the existing producers can provide mowing or mulching in the same build-up of the mowing device.

There is always necessary to amend an existing mowing device, or to install additionally components, or even to replace the mowing device to meet the required type of mowing.

The task of the invention is to overcome the above mentioned disadvantages of the prior art and to develop a mowing device that will be able to provide a wide array of an alternative mowing or mulching, especially grass areas, small natural seeded shrubs or similar vegetations, namely in the build-up of a single mowing device without interventions of a machine operator or replacement of the mowing device.

SUMMARY OF THE INVENTION

The above mentioned task has been met by the development of a mowing device according to the present invention for treating vegetations, which is adapted for the attachment to a carrier and for the connection to a drive unit.

The mowing device in question comprises a frame on which mowing spindles are attached, bearing on one side mowing blades and on the opposite side distributing members for the connection to the transmission members, wherein a transmission mechanism for driving the mowing spindles is also mounted upon the frame.

The solution according to the present invention is particularly characterized by the following features.

The mowing spindles are arranged in two mutually parallel rows, defined by longitudinal lines, located in a mutual distance separation L.

The mowing spindles of each row are interconnected via transmission members.

The centres of the mowing spindles of the first row are placed in a mutual spacing P.

The centres of the mowing spindles of the second row are placed in a mutual spacing P.

The centres of the mowing spindles of the second row are offset in the longitudinal direction by a one-half P/2 of the spacing P with respect to the centres of the mowing spindles of the first row.

A connecting line of the centre of each mowing spindle of the first row with the centre of an immediately adjacent mowing spindle of the second row forms with parallel longitudinal lines an acute angle $\alpha$, for which the following applies:

$$tg\,\alpha = \frac{L}{P/2}.$$

The size of the angle $\alpha$ is in the range from 15° to 60°.

The transmission mechanism for driving the mowing spindles comprises two interconnected transmission devices mounted side by side on the frame.

The first transmission device is arranged for the rotation in one rotational direction and is connected via transmission members with the mowing spindles of the first row.

The second transmission device is configured as a reverse one for an optional rotation of an output shaft of a gearbox in both rotational directions, and the second transmission device is associated via transmission members with the mowing spindles of the second row.

The first transmission device is preferably formed by an angular gearbox, wherein the second transmission device is preferably formed by a reverse angular gearbox.

The transmission devices are preferably selected from the group consisting of an angular gearbox, a reverse angular gearbox, electric motors, hydraulic motors and the like.

The distributing members are preferably selected from the group consisting of pulleys, toothed pulleys, chain gears, toothed gears and the like.

Transmission members are preferably selected from the group consisting of belts, V-belts, toothed belts, transmission chains, toothed gears and the like. In a preferred embodiment of the invention, the mowing spindles of first row are provided with cross mowing blades, while the mowing spindles of the second row are provided with bidirectional mowing blades above which double-acting fork-shaped mowing blades are mounted.

The mowing spindles of the second row can advantageously be provided with double-sided angular mowing blades, above which the double-acting fork-shaped mowing blades are mounted.

BRIEF DESCRIPTION OF THE DRAWINGS

The invention will be further explained in the form of an unlimited example of its practical embodiment, the description of which will be given with reference to the accompanying drawings, in which.

DETAILED DESCRIPTION OF THE INVENTION

Figure 1:
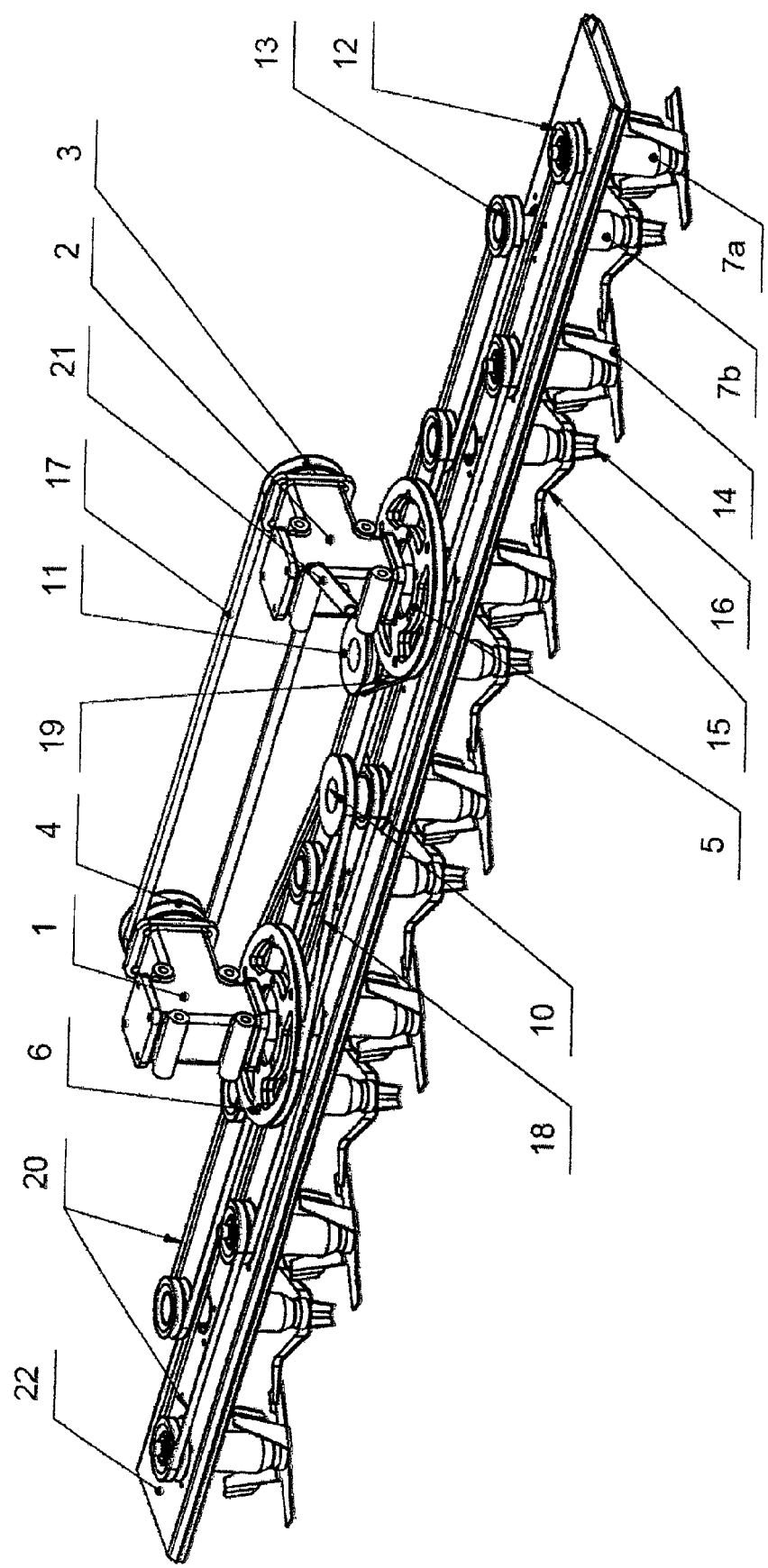
FIG. 1 shows an isometric view of a mowing device according to an exemplary embodiment of the present invention.

In terms of the unambiguous clarity, it is to be noted that for the purpose of the explanation of the features of the present invention, the common expressions and technical terms used in the description and in the claims have generally the following meanings:

- the carrier is a device or a machine, a tractor, a working four-wheeler, a carries of working tools, usually a mower and so on, on which the mowing device is mounted,
- the drive unit is a device for providing a driving torque for the mowing device, usually an combustion engine, a hydraulic motor, an electric motor or other similar device,
- the distributing members represent mechanical machine members to allow a torque transmission, selected from the group consisting of pulleys, toothed pulleys, chain gears, toothed gears, etc.,
- the transmission members represent mechanical machine members to allow a torque transmission, selected from the group consisting of belts, V-belts, toothed belts, chains, toothed gears, etc.,
- the transmission mechanism comprises two transmission devices, selected from the group consisting of angular gearboxes, reverse angular gearboxes, electric motors, hydraulic motors, etc.

On the accompanying drawings, a preferred embodiment of the present invention is shown.

As shown in FIGS. 1-4, the mowing device comprises a frame 22 on which two rows of mowing spindles 7a and 7b on parallel lines 8 and 9, and two angular gearboxes 1 and 2, representing the transmission devices, are mounted.

The mowing spindles 7a and 7b are provided on the lower side with the mowing blades 14, 15 and 16, and on the upper side with the pulleys 12 and 13.

On the reverse angular gearbox 2, an input pulley 3 of a gearbox 2 is placed, through which the gearbox 2 is connected via a transmission belt 17 with the angular gearbox 1, which is provided for this transmission with an input pulley 4 of the gearbox 1.

Figure 11:
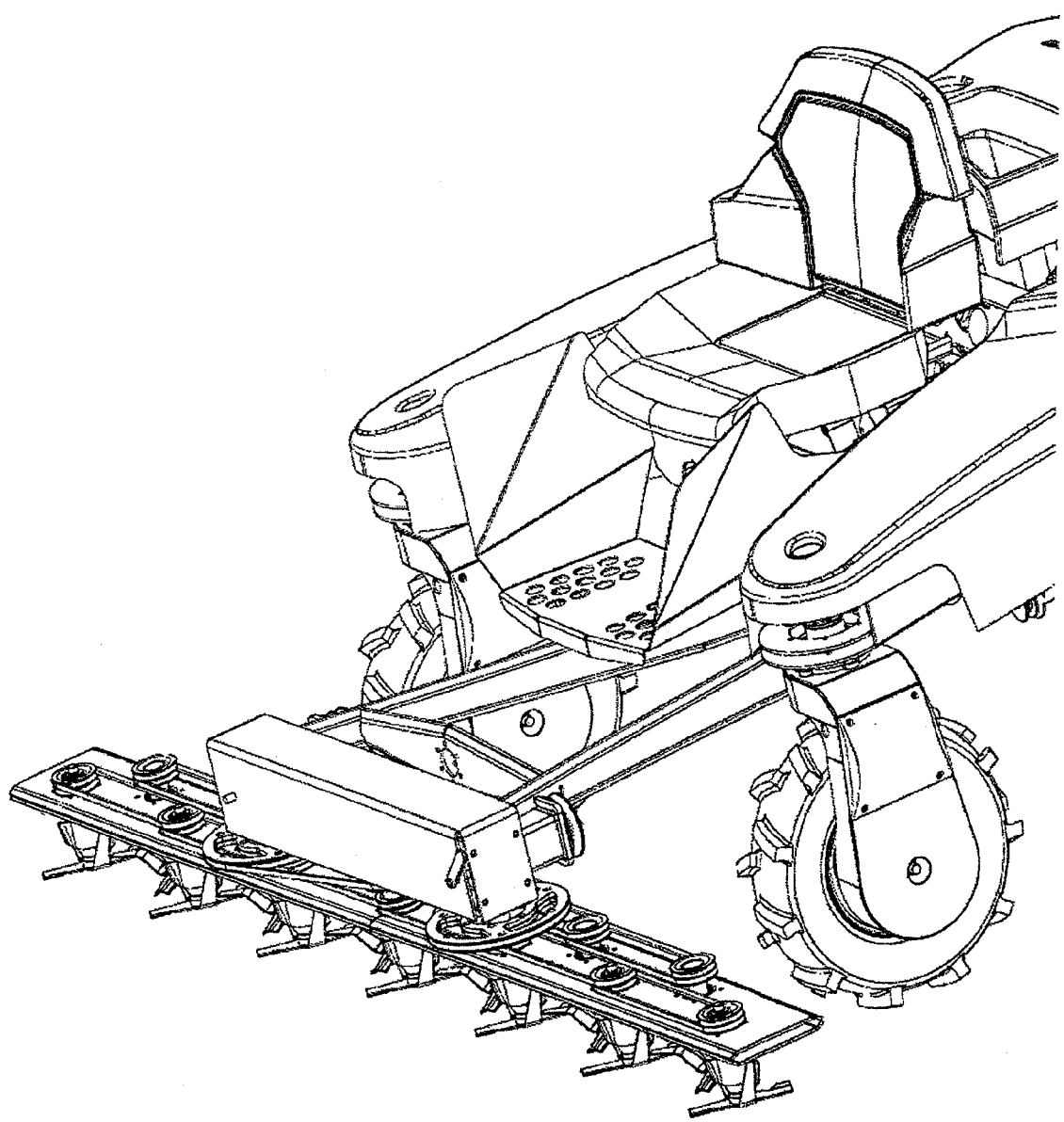
FIG. 11 shows the cutting device with a carrier.

The pulley 4 is also arranged as an input pulley of the mowing device, because the drive torque is conveyed upon the same from the drive unit of the carrier of the present mowing device, namely by this particular exemplary embodiment from an internal combustion engine of the mowing machine (see FIG. 11).

On the output side of the gearbox 1, an output pulley 6 of the gearbox 1 is installed, which is connected via a driving belt 18 for driving the first series of mowing spindles 7a on the line 8 with a drive pulley 10 of the first row of the mowing spindles 7a on the line 8.

The pulley 10 is connected over timing belts 20 with individual mowing spindles 7a of the first row on the line 8 via relevant pulleys 12 of the first row of the mowing spindles 7a on the line 8.

The mowing spindles 7a of the first row are arranged in a frame 22 of the mowing device on the longitudinal line 8.

Figure 2:
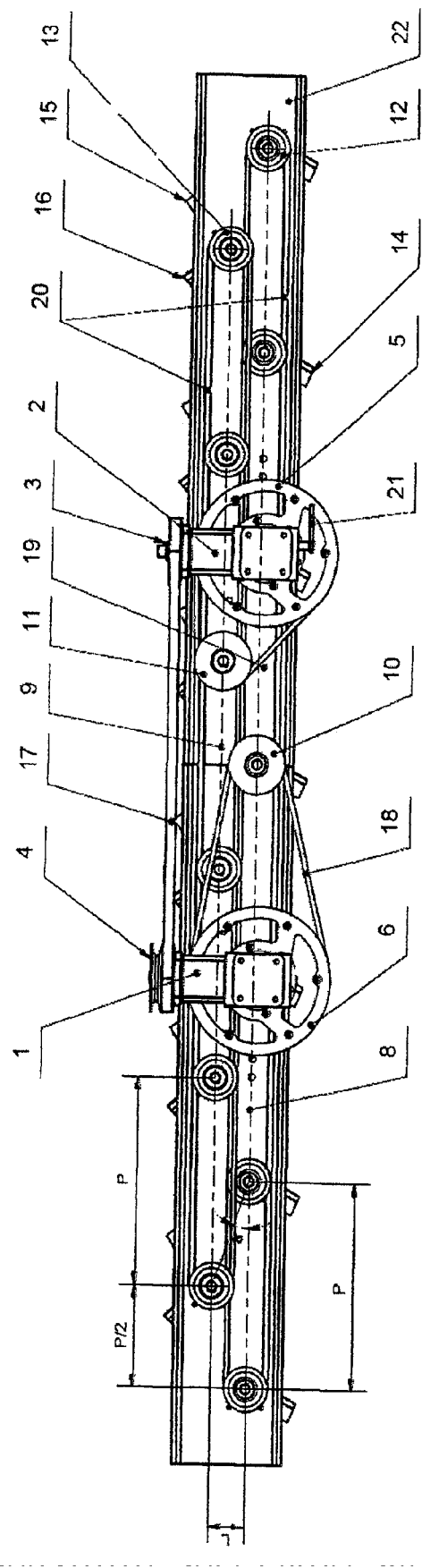
FIG. 2 shows a top view of the mowing device of FIG. 1.
Figure 3:
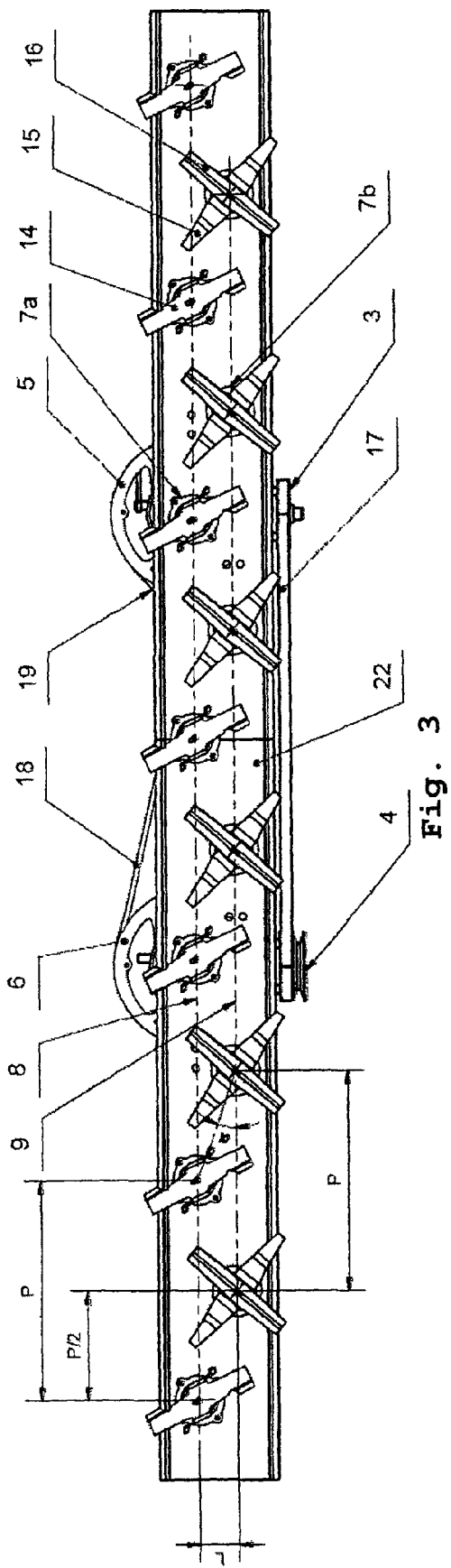
FIG. 3 shows a bottom view of the mowing device of FIG. 1.
Figure 4:
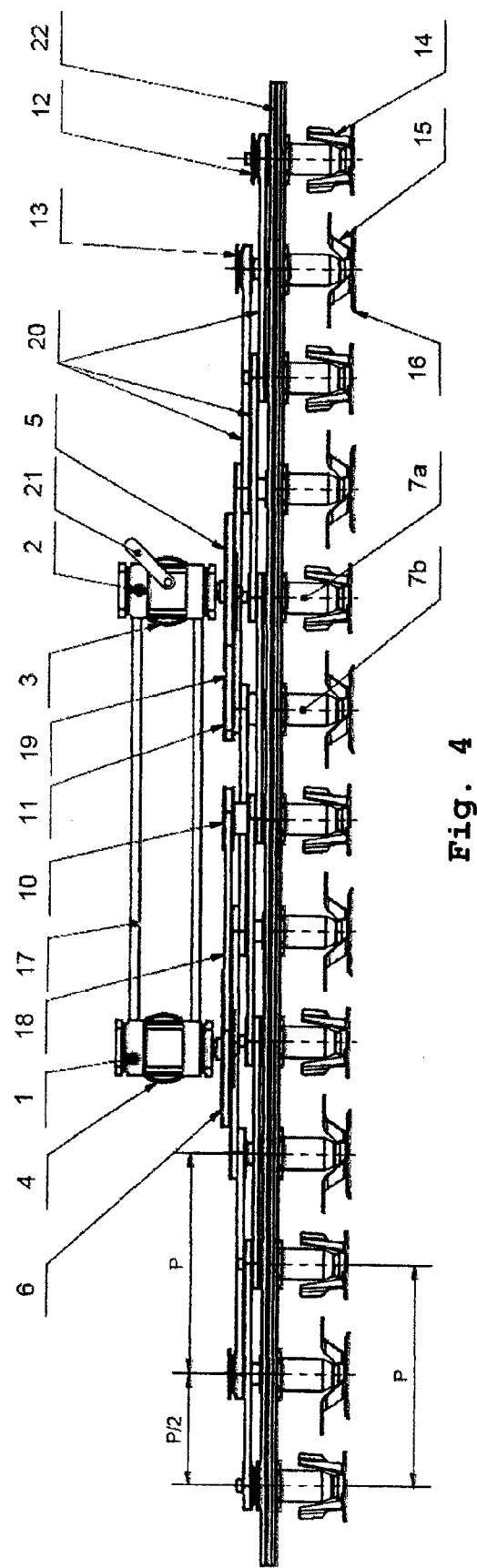
FIG. 4 shows a front view of the mowing device of FIG. 1.

The centres of the mowing spindles 7a of the first row are placed in the mutual spacing P (see FIG. 2 and FIG. 3).

The centre of each mowing spindle 7a of the first row is created by the intersection of the axis of rotation of the mowing spindle 7a to the plane defined by the lines 8 and 9.

The spacing P in the preferred embodiment represents a fixed constant distance.

Figure 9:
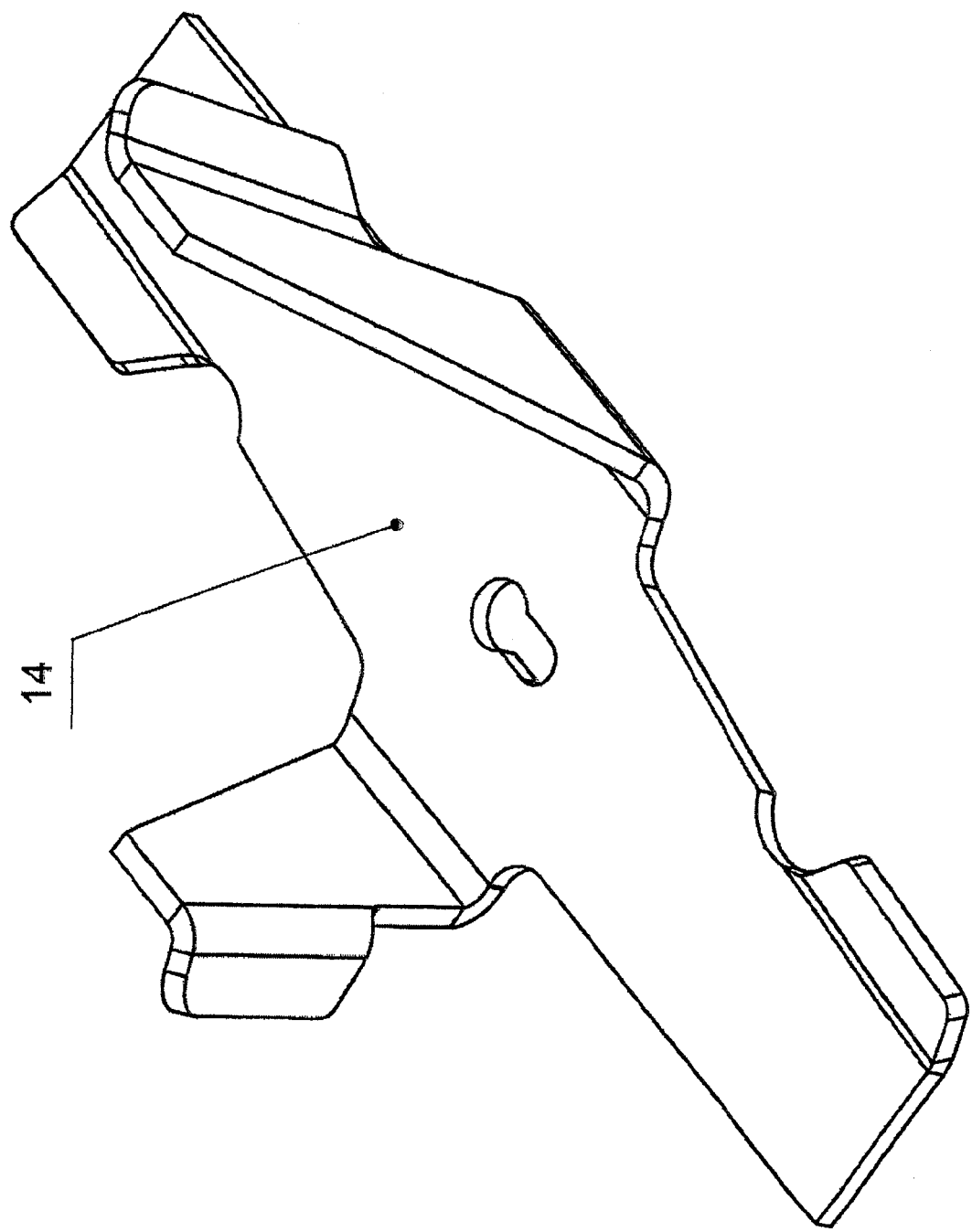
FIG. 9 shows a cross mowing blade.
Figure 10:
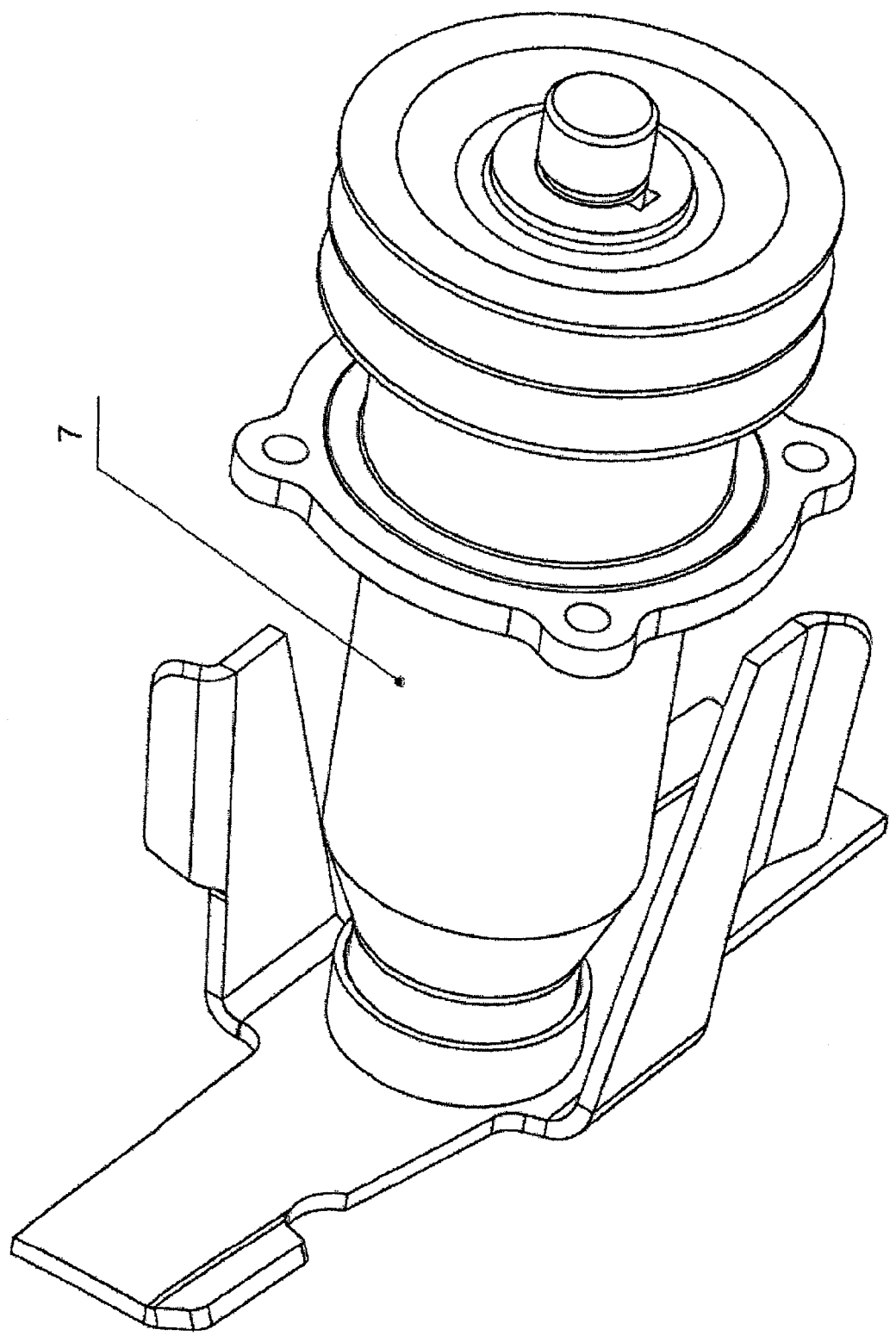
FIG. 10 shows a mower spindle with a pulley and a mowing blade.

The mowing spindles 7a of the first row on the line 8 are preferably provided with a cross mowing blade 14 (see FIG. 9 and FIG. 10).

On the output side of the reverse angular gearbox 2, an output pulley 5 of the gearbox 2 is positioned, which is connected via a drive belt 19 for driving the second row of the mowing pulleys 7b on the line 9 with a drive pulley 11 of the second row of the mowing pulleys 7b on the line 9.

The drive pulley 11 is connected via timing belts 20 with individual mowing pulleys 7b of the second row on the line 9 by means of relevant distributing pulleys 13 of the second row of the mowing spindles 7b on the line 9.

The mowing spindles 7b of the second row are arranged in a frame 22 of the mowing device on the longitudinal line 9.

The centres of the mowing spindles 7b of the second row are placed in the mutual spacing P (see FIG. 2 and FIG. 3).

The centre of each mowing spindle 7b of the second row consists of the intersection of the axis of rotation of the mowing spindle 7b to the plane defined by the lines 8 and 9.

The spacing P in the preferred embodiment is a fixed constant distance.

Figure 5:
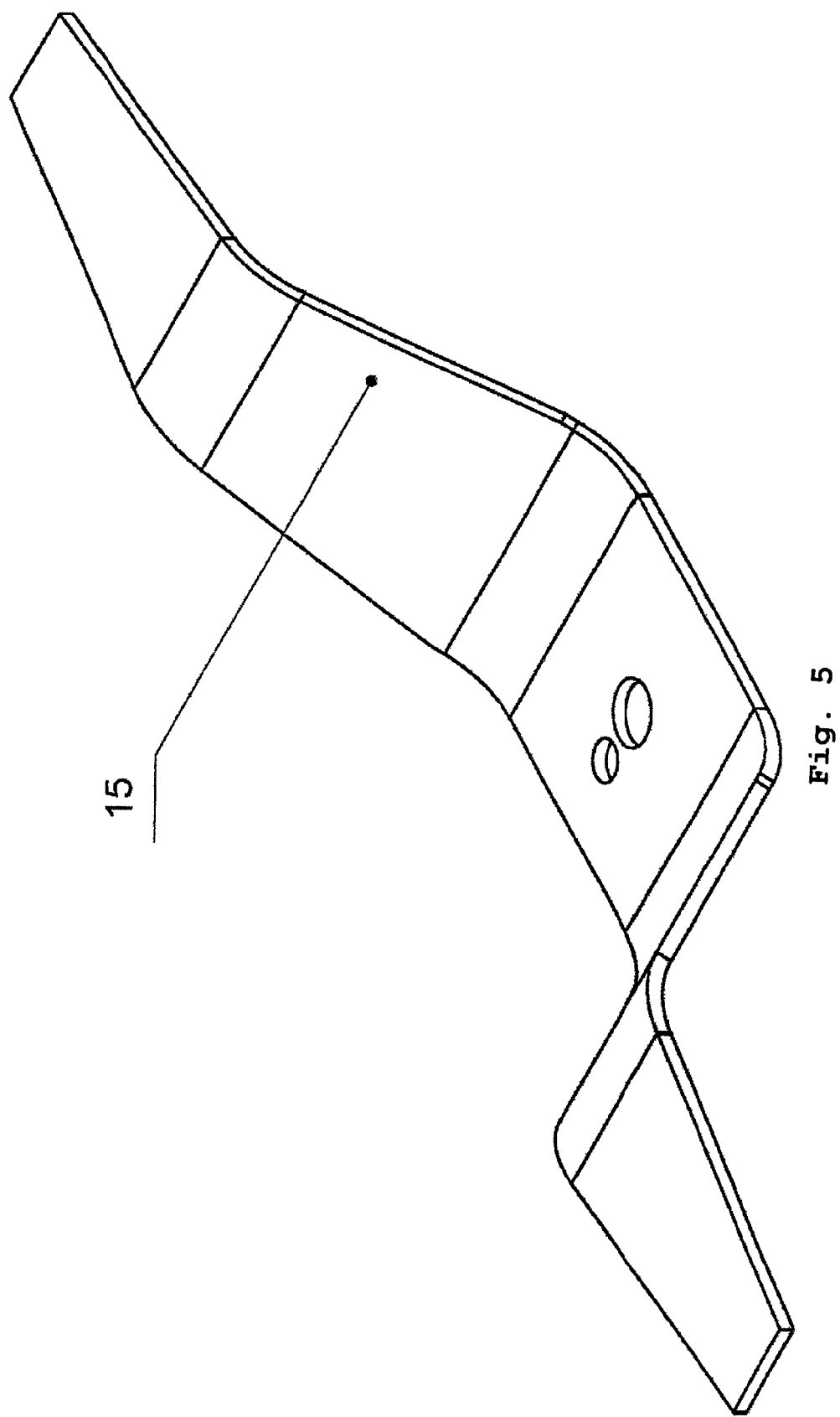
FIG. 5 shows a double-acting fork-shaped mowing blade.
Figure 6:
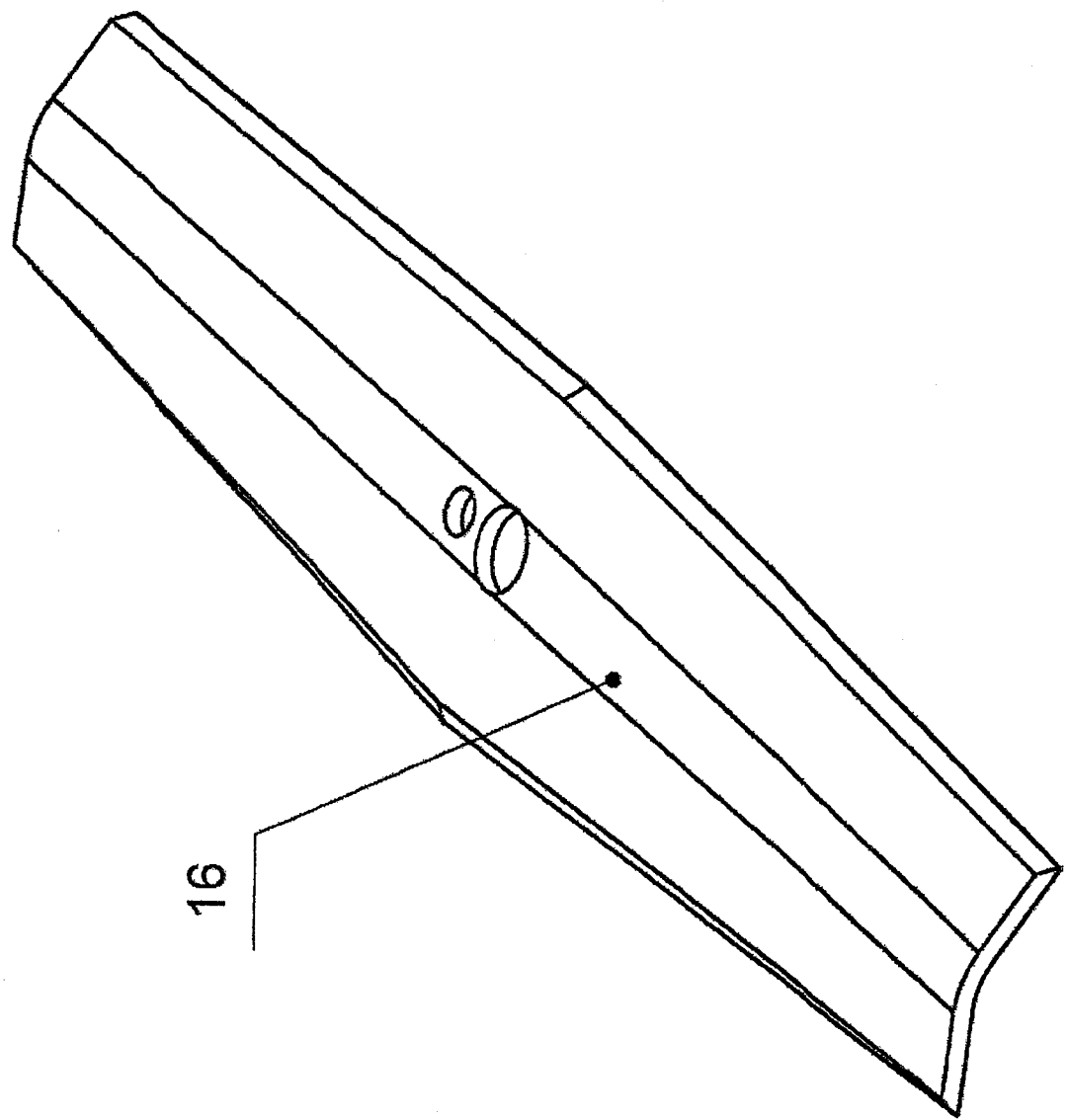
FIG. 6 shows a bidirectional mowing blade.
Figure 7:
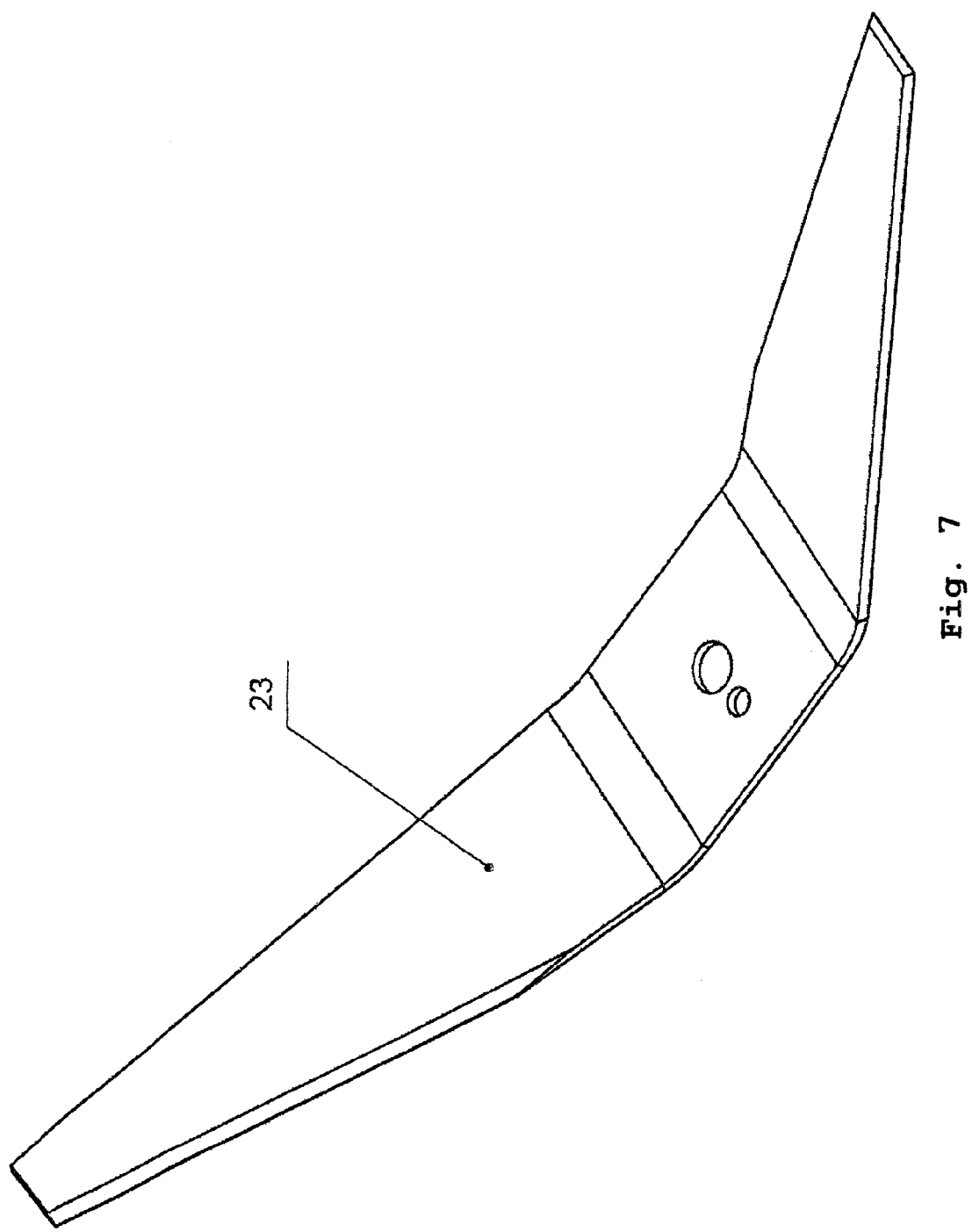
FIG. 7 shows a fork-shaped mowing blade.
Figure 8:
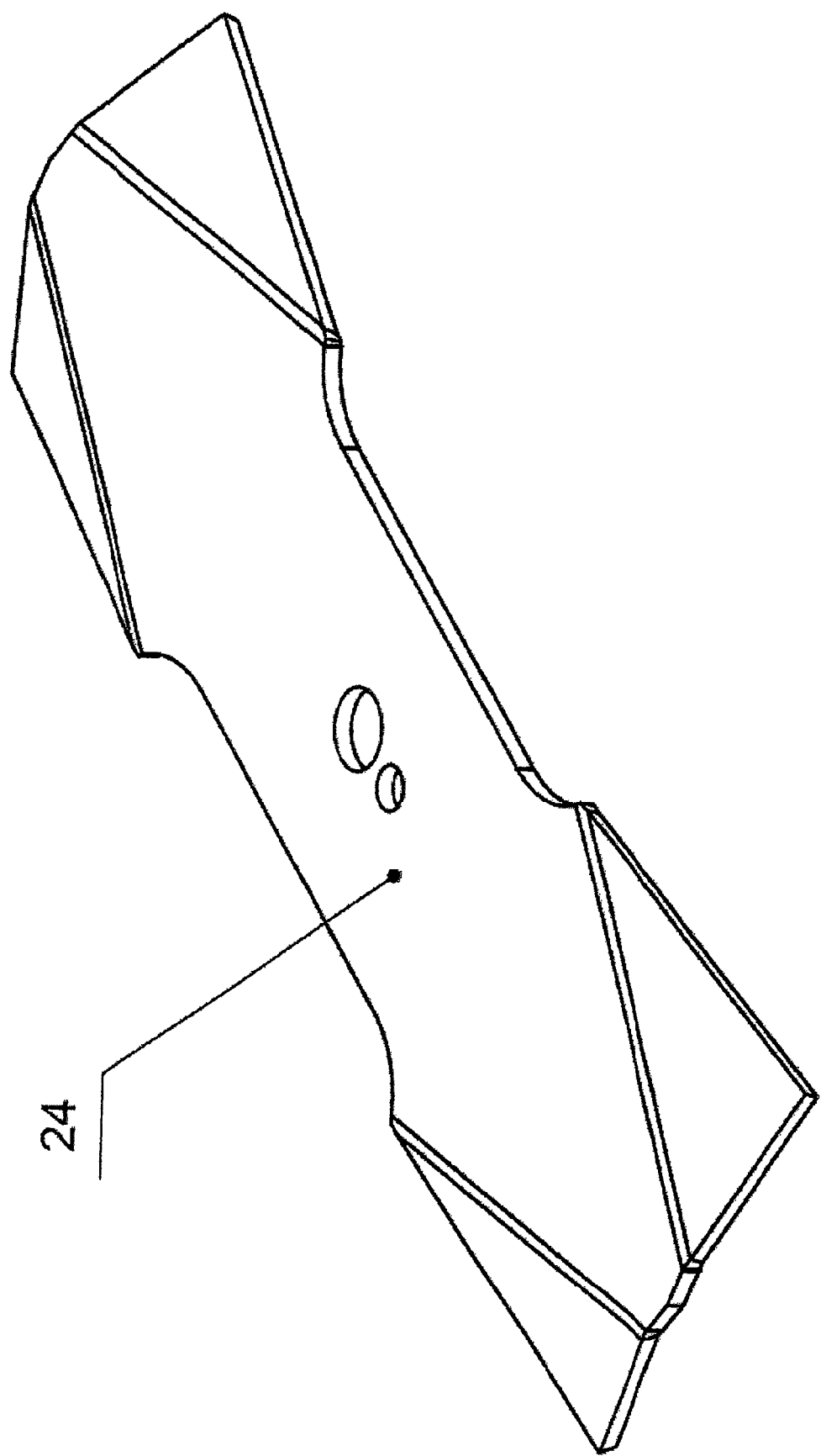
FIG. 8 shows a double-sided angular mowing blade.

The mowing spindles 7b of the second row on the line 9 are preferably provided with a double acting fork-shaped mowing blade 15 and a double-sided mowing blade 16 (see FIG. 5 and FIG. 6), or a double-sided angular mowing blade 24 and a fork-shaped mowing blade 23 (see FIG. 7 and FIG. 8).

The longitudinal line 9 is parallel to the longitudinal line 8, and both lines 8 and 9 are positioned in a mutual distance separation L.

A construction of the reverse angular gearbox 2 is a prior art and it is arranged to allow a reversion of the rotational direction.

Figure 12:
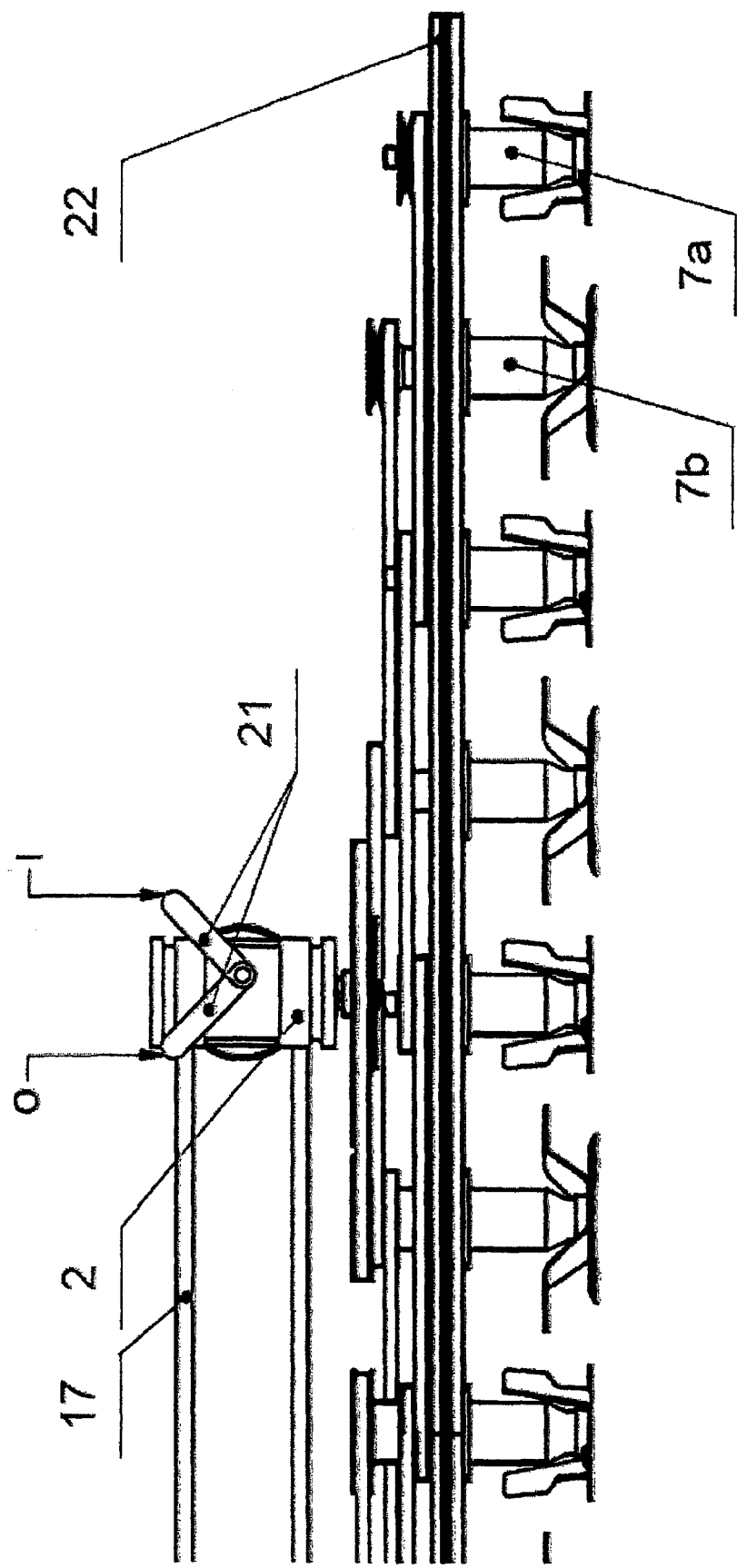
FIG. 12 shows the extreme positions of the lever 21 of the reverse running.

The reversion of the rotational direction takes place using a two-position lever 21 of the reverse running, which is equipped with the reverse angular gearbox 2 (see FIG. 12).

In the position 0, the output shaft of the gearbox 2 rotates in the identical manner as the input shaft thereof, and in the position I the output shaft 2 rotates in the opposite sense of rotations than the input shaft of the gearbox, thereby changing the rotation direction of mowing spindle 7b of the second row on the line 9.

The centres of the mowing spindles 7b of the second row on the line 9 are located in a plan view (see FIG. 2 and FIG. 3) between the centres of the mowing spindles 7a of the first row on the line 8 in such a way that they are offset relative to each other by a one-half P/2 of the spacing P.

The longitudinal lines 8 and 9 are parallel to each other. Between the line 8 of the first row of the mowing spindles 7a and the line 9 of the second row of the mowing spindles 7b is the distance L.

In a plan view (see FIG. 2 and FIG. 3), the connecting line of the centre of each mowing spindle 7a of the first row on the line 8 with the centre of the directly opposite mowing spindle 7b of the second row on the line 9 forms with the parallel lines 8 and 9 an acute angle α, for which the following applies:

$$tg\,\alpha = \frac{L}{L/2}.$$

The angle α is preferably selected in the range from 15° to 60°.

In this particular preferred embodiment, the mowing device is driven by an internal combustion engine of the mowing machine, carrying the mowing device in question, and the driving torque is transmitted to the input pulley 4 of the gearbox 1.

In other exemplary embodiments, the drive unit, consisting of an internal combustion engine, can be preferably replaced with another source of driving torque for the mowing device, such as an electric motor, a hydraulic motor, or the like.

In another exemplary embodiments, the transmission devices formed by the angular gearboxes, can be preferably replaced by electric motors, hydraulic motors, or other devices capable to independently drive the two rows of the mowing spindles and to change the rotational direction.

The function of the mowing device according to this invention is as follows.

The driving torque from the drive unit is conveyed to the input pulley 4 of the angular gearbox 1.

From the angular gearbox 1, the driving torque is transmitted via the system of the transmission members and the distributing members on individual mowing spindles 7a of the first row on the line 8.

This ensures the rotation of the mowing spindles 7a of the first row on the line 8 in one rotational direction.

The reverse angular gearbox 2, which is provided with an input pulley 3 is connected via the connecting belt 17 with the angular gearbox 1, which is provided with an input pulley 4, whereby the delivery of the driving torque across the input pulley 3 is secured to the reverse angular gearbox 2 as well.

A construction of the reverse angular gearbox 2 is a prior art, and it allows to reverse the sense of the output rotation by means of a lever 21 of the reverse running of the gearbox 2.

From the reverse angular gearbox 2, the driving torque is transmitted through a system of transmission members and distribution members to individual mowing spindles 7b of the second row on the line 9.

This ensures the rotation of the mowing spindles 7b of the second row on the line 9 in both rotational directions, i.e. to the right clockwise, or to the left anticlockwise, namely optionally according to the requirements.

The transmission members and distributing members in this preferred embodiment comprise mainly:
  the output pulleys 5 and 6,
  the drive pulleys 10 of the first row on the line 8 and the drive pulleys 11 of the second row on the line 9,
  the system of distributing pulleys 12 and 13 of the first and second row, and
  the system of distributing belts 20 of the mowing spindles 7a and 7b and drive belts 18 and 19.

In the event that the user selects the rotation of the mowing spindles 7a of the first row on the line 8 to the right in a clockwise direction through the angular gearbox 1, the output pulley 6, the drive belt 18, the drive pulley 10, the distributing belt 20, and the distributing pulley 12, while simultaneously the mowing spindles 7b of the second row on the line 9 are rotating in the same direction, that is to the right in a clockwise direction through the angular gearbox 2, the output pulley 5, the drive belt 19, the drive pulley 11, the distributing belt 20, and the distributing pulley 13, thus a mulching is performed by which the grass or other vegetation are cut into small pieces through the special mowing blades and incorporated into the mown turf, where it acts as a fertilizer.

The mulching occurs when the lever 21 is turned to the position 0.

In the event that the user selects the rotation of the mowing spindles 7a of the first row on the line 8 to the right in a clockwise direction through the angular gearbox 1, the output pulley 6, the drive belt 18, the drive pulley 10, the distributing belt 20, and the distributing pulley 12, while simultaneously the mowing spindles 7b of the second row on the line 9 are rotating in the counter direction, that is to the left in an anticlockwise direction through the angular gearbox 2, the output pulley 5, the drive belt 19, the drive pulley 11, the distributing belt 20, and the distributing pulley 13, thus a mower of a grassland or other vegetation is performed, by which the grass or other vegetation are left laying on the spot, and they are not cut into small pieces as it is the case when mulching.

The simple mower of the vegetation occurs when the lever 21 is turned into the position I.

Under operation, the mowing device is moving in such a way that in the first instance the first row of the mowing spindles 7a on the line 8 performs its function and immediately afterwards the second row of the mowing spindles 7b on the line 9.

INDUSTRIAL APPLICABILITY

According to the present invention, the mowing device having two mowing functions of a grassland or other vegetation without unnecessary power losses and without mechanical adjustments or retrofitting or replacement of mowing blades has been developed, with the possibility of a simple change of the mowing function.

The invention may replace two different types of cutting devices, i.e. a mulching and mitring device.

The invention has solved the arrangement of the mowing spindles in the device frame, their drive and the rotational direction of individual mowing spindles, bearing the respective mowing blades.

The mowing device is characterized by a low power consumption with a large cut, as well as a high-quality mowing or mulching, it guarantees a low energy demand, a lower fuel consumption and thus a lesser emission of exhaust gases.

In this design, there is no need of a large volume aggregate to drive the present mowing device.

The small diameter of the mowing blades is manifested by low friction losses, and thus a less energy consumption.

The objective mowing device is preferably developed in such a way that within one structural solution fulfils the role of two types of mowing devices, because the said device in one build-up performs mulching or mowing, namely without complicated adjustments.

The applicability of the invention relates especially to all machines for garden or farm machinery, for treating parklands, public or private grassy or wooded areas, as well as for other similar cases.

LIST OF REFERENCE CHARACTERS

1—angular gearbox
2—reverse angular gearbox
3—input pulley 3 of the gearbox 1
4—input pulley 4 of the gearbox 2
5—output pulley 5 of the gearbox 1
6—output pulley 6 of the gearbox 2
7a-mowing spindles 7a of the first row on the line 8
7b-mowing spindles 7b of the second row on the line 8
8—line 8 of the first row of the mowing spindles 7a
9—line 9 of the second row of the mowing indles 7b
10—drive pulley 10 of the first row of the mowing spindles 7a

11—drive pulley 11 of the second row of the mowing spindles 7*b*
12—distributing drive pulley 12 of the first row of the mowing spindles 7*a*
13—distributing drive pulley 13 of the second row of the mowing spindles 7*a*
14—cross mowing blade 14 of the first row of the mowing spindles 7*a*
15—double-acting fork-shaped mowing blade 15 of the second row of the mowing spindles 7*b*
16—double-sided mowing blade 16 of the second row of the mowing spindles 7*b*
17—connecting belt 17 of the gearbox 1, 2
18—drive belt 18 of the first row of the mowing spindles 7*a*
19—drive belt 19 of the second row of the mowing spindles 7*b*
20—distributing belt 20 of the mowing spindles 7
21—lever 21 of the reverse running for the change of a rotational direction of the reverse angular gearbox
22—frame 22 of the mowing device
23—fork-shaped mowing blade
24—double-sided angular mowing blade
L—distance
P—spacing
P/2—one-half P/2 of the spacing P
0—position
I—position
A—angle

The invention claimed is:

1. A mowing device that is attachable to a carrier and connectable to a drive unit, the mowing device comprising:
    (a) a frame;
    (b) a multiplicity of mowing spindles mounted on the frame and disposed in a plurality of mutually parallel rows, including a first row and a second row, wherein each of the first and second rows comprises a plurality of the mowing spindles, wherein the first and second rows define parallel longitudinal lines separated by a distance L, and wherein each of the plurality of mowing spindles of the first and second rows has a center that is spaced apart from the center of a next adjacent mowing spindle in a same row by a distance P;
    (c) a transmission mechanism positioned on the frame for driving the multiplicity of mowing spindles, the transmission mechanism comprising first and second transmission devices mounted side by side on the frame and being mutually connected;
    (d) first transmission means for connecting the first transmission device with the plurality of mowing spindles of the first row; and
    (e) second transmission means for connecting the second transmission device with the plurality of mowing spindles of the second row;
    wherein the first transmission device has an output shaft that is rotatable to drive the plurality of mowing spindles of the first row in a first rotational direction and the second transmission device has an output shaft that is rotatable to drive the plurality of mowing spindles of the second row in either the first rotational direction or in a second rotational direction that is reverse to the first rotational direction;
    wherein each of the plurality of mowing spindles of the first row comprises a mowing blade on a lower side and a distributing element on an upper side for connection to the first transmission means, and each of the plurality of mowing spindles of the second row comprises a mowing blade on a lower side and a distributing element on an upper side for connection to the second transmission means; and
    wherein the respective centers of the plurality of mowing spindles of the second row are offset from the respective centers of the plurality of mowing spindles of the first row in a direction of the longitudinal lines by a distance P/2 and a line connecting the center of each mowing spindle of the first row with the center of a closest adjacent mowing spindle of the second row forms with the parallel longitudinal lines an acute angle a, which satisfies the following equation:

$$tg\,\alpha = \frac{L}{P/2}$$

wherein the size of angle α is from 15° to 60°.

2. The mowing device according to claim 1, wherein the first transmission device comprises an angular gearbox and the second transmission device comprises a reverse angular gearbox.

3. The mowing device according to claim 1, wherein each of the first and second transmission devices comprises an angular gearbox, a reverse angular gearbox, an electric motor, or a hydraulic motor.

4. The mowing device according to claim 1, wherein each of the distributing elements of the multiplicity of mowing spindles is selected from the group consisting of pulleys, toothed pulleys, chain gears and toothed gears.

5. The mowing device according to claim 1, wherein each of the first and second transmission means comprises a belt, a V-belt, a toothed belt, a transmission chain or a toothed gear.

6. The mowing device according to claim 1, wherein each of the plurality of mowing spindles of the first row comprises a cross mowing blade.

7. The mowing device according to claim 1, wherein each of the plurality of mowing spindles of the second row comprises a double-sided mowing blade with a double-acting fork-shaped mowing blade mounted above.

8. The mowing device according to claim 1, wherein each of the plurality of mowing spindles of the second row comprises a double-sided angular mowing blade with a fork-shaped mowing blade mounted above.

9. The mowing device according to claim 1, wherein the mowing device comprises means for selectively changing the rotation of the output shaft of the second transmission device to cause a change in the rotational direction of the mowing spindles of the second row from the first rotational direction to the second rotational direction or vice versa.

10. The mowing device according to claim 9, wherein the means for changing the rotational direction of the mowing spindles of the second row comprises a lever that is movable between (a) a first position wherein the first and second transmission devices cause the respective mowing spindles of the first and second rows to rotate in the same direction and (b) a second position wherein the first and second transmission devices cause the respective mowing spindles of the first and second rows to rotate in opposite directions.

11. The mowing device according to claim 9, wherein each of the plurality of mowing spindles of the first row comprises a cross mowing blade.

12. The mowing device according to claim 9, wherein each of the plurality of mowing spindles of the second row comprises a double-sided mowing blade with a double-acting fork-shaped mowing blade mounted above.

13. The mowing device according to claim 9, wherein each of the plurality of mowing spindles of the second row comprises a double-sided angular mowing blade with a fork-shaped mowing blade mounted above.

14. A method for the treatment of first and second areas of vegetation comprising
  (a) providing the mowing device of claim 9;
  (b) mowing the first area with the first and second transmission devices driving the respective mowing spindles of the first and second rows to rotate in the same direction;
  (c) operating the means for selectively changing to cause the first and second transmission devices to drive the respective mowing spindles of the first and second rows to rotate in opposite directions; and
  (d) mulching the second area of vegetation with the first and second transmission devices driving the respective mowing spindles of the first and second rows to rotate in opposite directions.

* * * * *